Patented Dec. 12, 1922.

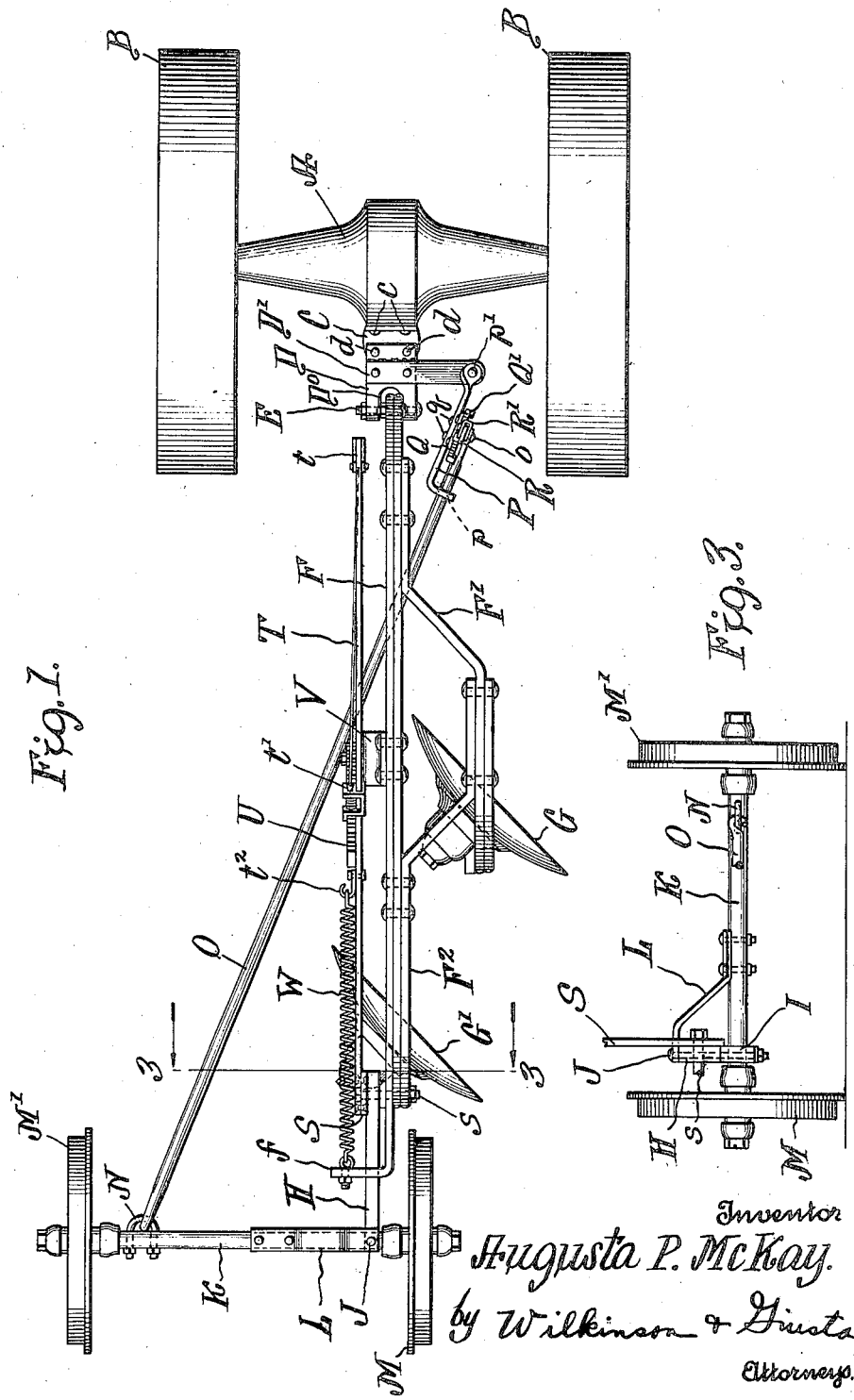

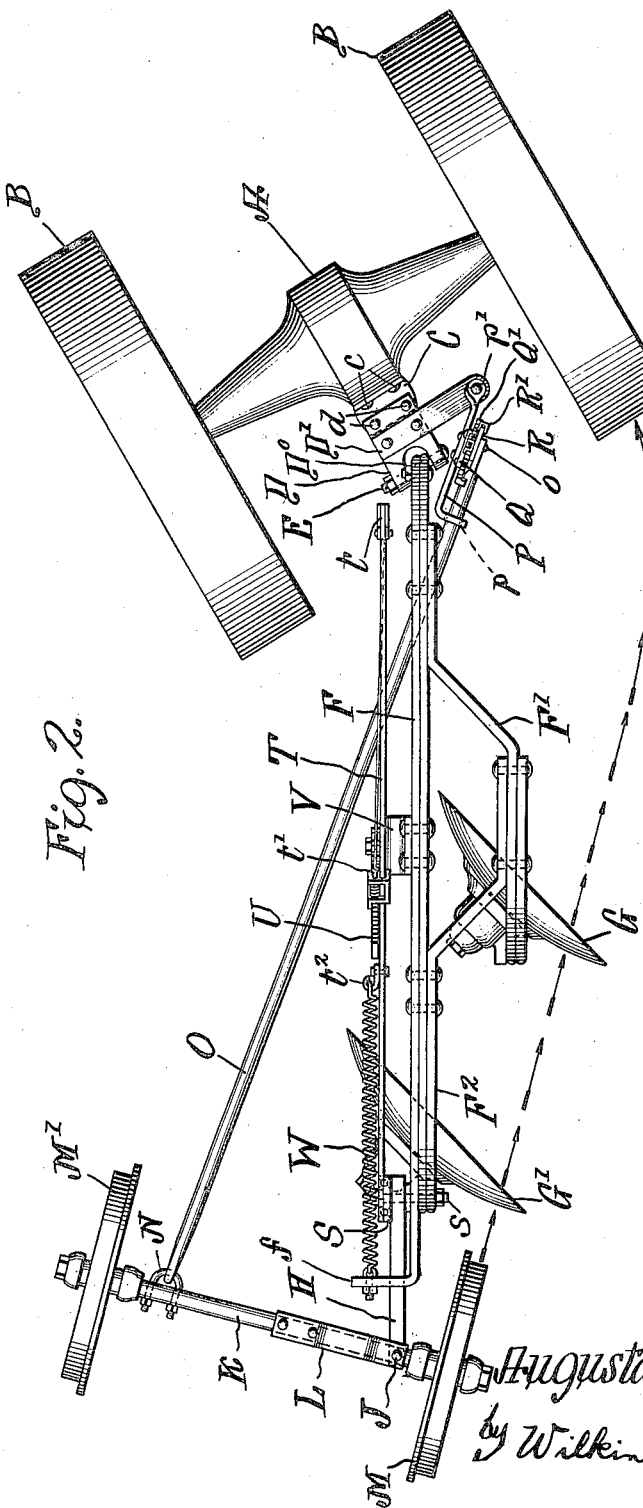

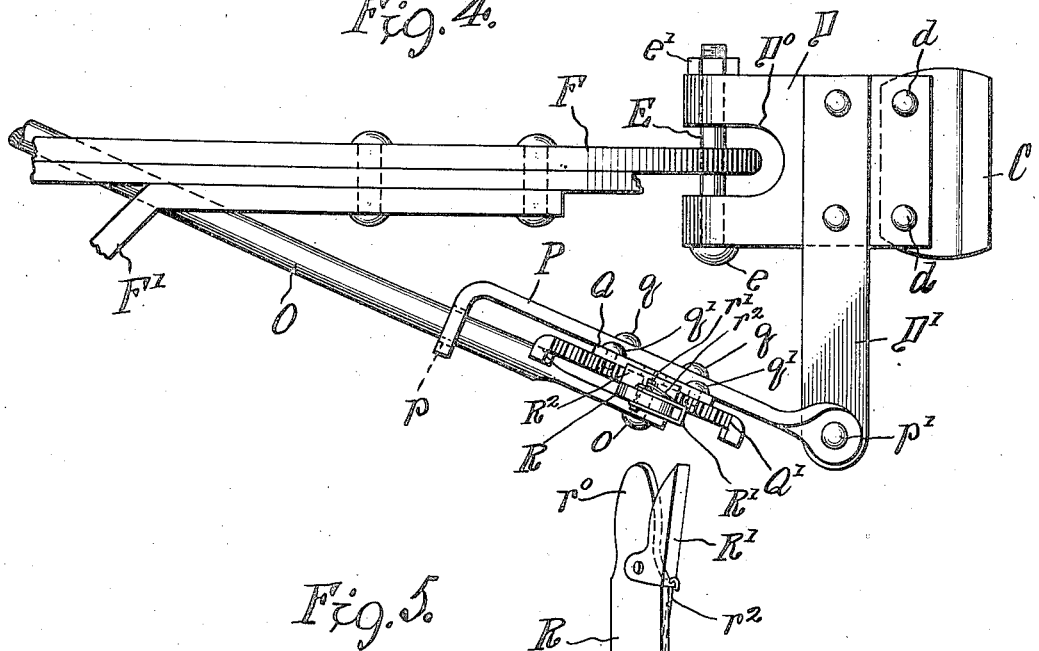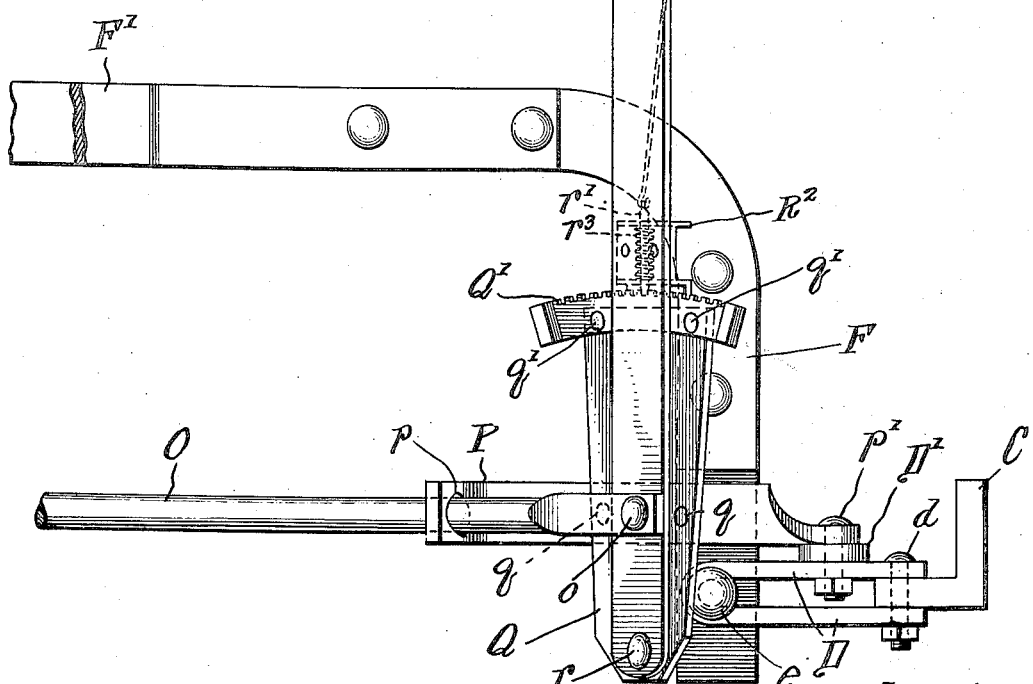

1,438,772

UNITED STATES PATENT OFFICE.

AUGUSTA POSTELLE McKAY, OF ROME, GEORGIA, ASSIGNOR TO McKAY DISK PLOW COMPANY, OF ROME, GEORGIA, A CORPORATION OF GEORGIA.

STEERING ARRANGEMENT FOR DISK PLOWS.

Application filed November 12, 1921. Serial No. 514,699.

*To all whom it may concern:*

Be it known that I, AUGUSTA P. McKAY, a citizen of the United States, residing at Rome, in the county of Floyd and State of Georgia, have invented certain new and useful Improvements in Steering Arrangements for Disk Plows; and I do hereby declare the following to be a full, clear, and exact description of the invention, such as will enable others skilled in the art to which it appertains to make and use the same.

My present invention relates more especially to plows intended for use in rolling or hilly country where it is desirable to have the furrows follow the contour lines of the ground.

In such cases the fields are more or less terraced, each terrace being run on a level, but the contour lines are, of course, very irregular following the horizontal section made by a plane with the hillside. Such terraces are more strictly speaking zones of a sphere, having the radius of the earth, but for all practical purposes they may be considered substantially as horizontal plane surfaces.

While the herein described arrangement is especially intended for use on hillsides, as stated, the plow may be also used with equal facility for ordinary plowing on level ground. The purpose of terracing the ground in the manner stated, and causing the furrows to follow the contour of the ground, is to prevent rain water from running down the furrows and accumulating in volume in the valleys and breaking over the terraces and causing gullies in the valleys, and washing off the top soil.

It will be seen that each field ordinarily has a succession of right and left curves in the furrows, as well as varying grades of hill slope. The automatic steering device hereinafter described is intended to take care of the lead of the plow wheels on the right and left curves, and the hand steering arrangement accommodates the lead of the plow wheels to the varying grades of hill slope; and since the right and left curves are on varying hill slopes it becomes necessary for the two devices to work in conjunction with each other, which is accomplished as will be hereinafter more fully described.

According to my invention I use a plow beam carrying the plows supported to the rear on a pair of wheels, the front end of the plow beam being connected to the rear end of the tractor, so that the rear wheels of the tractor together with the wheels supporting the rear end of the plow beam constitute in effect a four-wheeled vehicle; and by the hereinafter described construction the rear wheels supporting the rear end of the plow beam are automatically guided so that the plow will be caused to follow directly the course of the tractor around the curves.

The reasons for wanting the plow to follow the tracks of the tractor around curves are: first, to prevent the plow cutting a short course across curves on hillsides, and other irregular shaped fields thereby making an uneven width of furrow, or losing the front furrow entirely by being drawn into the previous furrow when the previous furrow is on the inner side of the curve, or else leaving unplowed ridges between furrows by being drawn away from the previous furrow when the previous furrow is on the outer side of the curve.

In addition to the advantages referred to, the hereinafter described device enables the operator to turn the apparatus around in a much smaller space without danger of the tractor wheels striking the plow beam.

My invention will be more fully understood after reference to the accompanying drawings, in which like parts are indicated by similar reference symbols throughout the several views, and in which:—

Figure 1 is a plan view of the steering arrangement as attached to the casing of the rear axle of the tractor, the casing for said axle and the tractor wheels being shown diagrammatically and the rest of the tractor being omitted for the sake of clearness in the drawings. This figure shows the arrangement adjusted for plowing straight furrows.

Figure 2 is a similar view to Fig. 1, but shows the apparatus adjusted for plowing left hand curved furrows.

Figure 3 shows a section along the line 3—3 of Figure 1, and looking in the direction of the arrows, parts being omitted for the sake of clearness in the drawings.

Figure 4 is a plan view on a larger scale showing the mode of connecting the plow beam to the tractor, and the automatic arrangement for causing the rear wheels to swing in the reverse direction from the front wheels; and Figure 5 is a side elevation of the parts seen in Figure 4, looking towards the top of the sheet.

A represents the casing in which the rear axle and differential are mounted, and which is shown diagrammatically in Figures 1 and 2. Supporting this casing are the tractor wheels B which are connected to the differential in the usual way.

C represents an angle plate or draw-bar connected to the casing A by means of the bolts c.

D represents the plow clevis which is fastened to the draw-bar C by means of the bolts d. This clevis is preferably made of a single sheet of metal bent in the U-shaped form as shown in Figure 5, and is provided at its outer curved edge with a U-shaped slot D° into which the free end of the plow beam projects, as shown in Figs. 4 and 5.

The coupling pin E in the form of a bolt passes through the clevis, as shown in Figs. 4 and 5, and has an enlarged head e at one end, and at the other end is secured in place by a nut e'. This coupling pin has more or less freedom of movement in the clevis, as shown.

F represents the plow beam which is preferably made of a series of metal plates bolted together, and provided with the usual frames F' and F² for the journal bearings of the disk plows G and G'. Projecting from the rear end of the plow beam is a horizontal bar H, rigidly attached to the plow beam, and having its outer end resting on the block I which is fast to the axle K, and projecting down through this bar H and the block I is the pivot bolt J to which the axle is eccentrically pivoted.

The axle may be conveniently stiffened or braced by means of the brace plate L, shown in Figs. 1, 2 and 3. Rotatably mounted on the axle K are the wheels M and M'. The axle K is provided with a suitable attachment, such as the U bolt N, see Figs. 1 and 2, to which is pivoted the rear end of the steering bar O. The front end of said bar passes freely through the slot p in the guide bar P, which bar is pivoted, as at p', to the horizontal arm or outrigger D', fast to the clevis D. The forward end of the steering bar O is pivoted, at at o,, to the lever R, which lever is pivoted, as at r, to the plate Q, fastened to the bar P as by means of the rivets q. This plate Q carries a rack Q' which is fastened to the plate by means of the rivets q', see Figure 5.

The handle r° of the lever R carries the bell crank lever R', which serves as a gripping arrangement to control the spring impressed pawl r' by means of the connecting rod r². This spring impressed pawl r' is normally pressed into engagement with the rack Q' by means of the spring r³, mounted in the housing R² carried by the lever R. The lever R is shown in the middle position in Figs. 1 and 5. By throwing this lever forward, the axle K may be swung to the position shown in Fig. 2, and by moving this lever backwards, the axle K may be swung to the reverse position. In going around curves the rear axle of the plow and the rear axle of the tractor should always point towards the center of the curve.

In Figure 2 the position of the two axles is shown in making a left hand curve. In making a right hand curve, the center of the curve will be on the opposite side of the wheels from what is shown in Figure 2.

Pivoted as at s to the forward end of the bar H is the standard or bar S, to the upper end of which the depth lever T is secured, which lever is provided with the handle t and with the spring impressed pawl t' engaging the rack U, which rack is attached to the plate V carried by the plow beam, as shown in Figs. 1 and 2.

The lifting spring W is connected at one end to the hook t² carried by the lever T, and at the other to the laterally projecting arm f projecting from the rear of the plow beam. This lifting lever arrangement and its operation are well known in the art, and as they do not constitute per se a part of my invention will not be further described herein. Any suitable arrangement for raising or lowering the rear end of the plow beam might be adopted, and there are many such well known in the art.

The operation of the device is as follows:

The operator who is riding on the tractor adjusts the plow beam for the slope of the hillside in the usual way by means of the depth lever T. He swings the rear axle K about its pivot J by means of the steering lever R. Pulling said lever forward will compensate for left-hand curves; shoving it back will compensate for right-hand curves in the contour of the field being plowed.

A skilled operator can very readily determine the requisite movement of the lever in order to meet the varying shapes of the contour lines of the field being plowed.

It will be obvious that various modifications might be made in the construction, combination and arrangements of parts which could be used without departing from the spirit of my invention; and I do not mean to limit the invention to such details except as particularly pointed out in the claims.

Having thus described my invention what I claim and desire to secure by Letters Patent of the United States is:—

1. The combination with a tractor having a rearwardly projecting clevis, and an arm projecting laterally from said clevis, of a plow beam coupled to said clevis and provided at its rear with a rearwardly projecting extension, an axle with a pair of wheels journaled thereon, said axle being eccentrically pivoted to said extension of the plow beam, a laterally inclined steering bar coupled to said axle at a distance from said pivot, a guide bar pivoted to said laterally projecting arm and engaging said steering bar, a rack segment secured to said guide bar, and a steering lever pivoted to said rack segment and provided with a spring pawl arrangement adapted to engage the rack on said segment, said lever being also pivoted to said steering bar near its forward end.

2. The combination with a tractor having a rearwardly projecting clevis, and an arm projecting laterally from said clevis, of a plow beam coupled to said clevis and provided at its rear with a rearwardly projecting extension, an axle with a pair of wheels journaled thereon, said axle being eccentrically pivoted to said extension of the plow beam, a laterally inclined steering bar coupled to said axle at a distance from said pivot, a guide bar pivoted to said laterally projecting arm and engaging said steering bar, a rack segment secured to said guide bar, a steering lever pivoted to said rack segment and provided with a spring pawl arrangement adapted to engage the rack on said segment, said lever being also pivoted to said steering bar near its forward end, and a lifting lever with mechanism controlled thereby for adjusting the plow relative to the slope of the hillside.

3. The combination with a tractor having a rearwardly projecting draw-bar, with a clevis in the form of a U-shaped plate fast to said draw-bar, an arm projecting laterally from said clevis, of a plow beam coupled to said clevis, and provided at its rear with a rearwardly projecting extension, an axle with a pair of wheels journaled thereon, said axle being eccentrically pivoted to said extension of the plow beam, a laterally inclined steering bar coupled to said axle at a distance from said pivot, a guide bar pivoted to said laterally projecting arm and engaging said steering bar, a rack segment secured to said guide bar, and a steering lever pivoted to said rack segment and provided with a spring pawl arrangement adapted to engage the rack on said segment, said lever being also pivoted to said steering bar near its forward end.

4. The combination with a tractor having a rearwardly projecting draw-bar, with a clevis in the form of a U-shaped plate fast to said draw-bar, an arm projecting laterally from said clevis, of a plow beam coupled to said clevis and provided at its rear with a rearwardly projecting extension, an axle with a pair of wheels journaled thereon, said axle being eccentrically pivoted to said extension of the plow beam, a laterally inclined steering bar coupled to said axle at a distance from said pivot, a guide bar pivoted to said laterally projecting arm and engaging said steering bar, a rack segment secured to said guide bar, a steering lever pivoted to said rack segment and provided with a spring pawl arrangement adapted to engage the rack on said segment, said lever being also pivoted to said steering bar near its forward end, and a lifting lever with mechanism controlled thereby for adjusting the plow relative to the slope of the hillside.

AUGUSTA POSTELLE McKAY.

Witness:
E. L. CANTRELL.